Feb. 6, 1951 V. DI MARZO 2,540,812
WATER CLOSET BOWL WITH CLEANOUT OPENING
Filed July 2, 1948
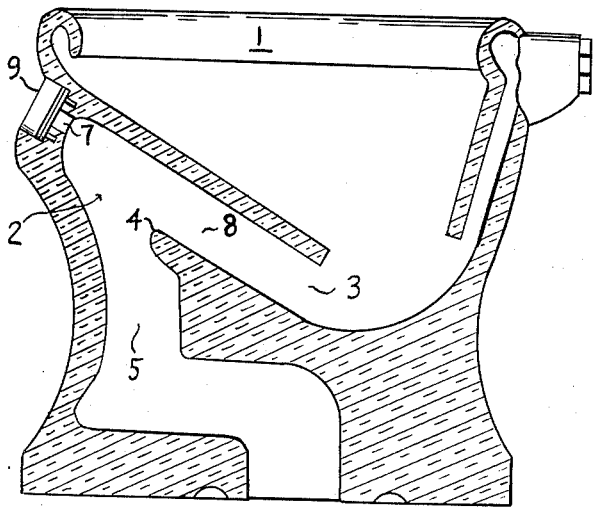
FIG. 1
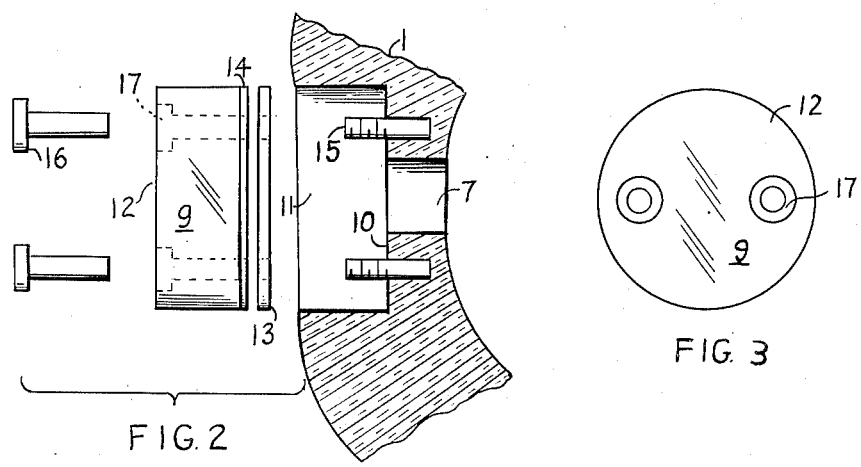
FIG. 2
FIG. 3
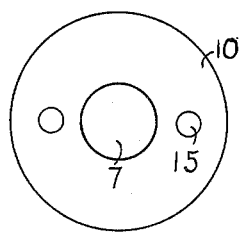
FIG. 4
INVENTOR.
VINCENT DI MARZO
BY Nicholas J. Garofalo
ATTORNEY Patented Feb. 6, 1951

2,540,812

UNITED STATES PATENT OFFICE 2,540,812

WATER CLOSET BOWL WITH CLEANOUT OPENING

Vincent Di Marzo, Bronx, N. Y.

Application July 2, 1948, Serial No. 36,610

1 Claim. (Cl. 4—257)

This invention relates to improvements in water closet bowl with cleanout opening, and the like.

The primary object of my invention consists in providing conventional type water closet bowls, and the like, such as wall urinals having similar type traps, with an opening through the exterior wall of the bowl permitting access of a probe to the interior, or middle arm of the trap, and in providing such opening with a removable seal or plug.

Another object of this invention is an improvement in water closet bowls so as to facilitate the removal of obstructing objects which lodge in the majority of cases in the middle arm of the bowl trap.

Another object of this invention is not only to facilitate removal of the obstructing article from the bowl, but also to make it unnecessary at any time to remove the bowl from its base to eject the obstruction.

This opening through the outside wall of the bowl represents a decided improvement in water closet bowls. By means of this opening a probe or other suitable instrument may be inserted through the opening into the middle arm of the trap to eject or force out the obstructing article.

It is to facilitate the removal of the obstruction in the middle arm of the bowl trap to which my invention is primarily directed. It is this middle arm where most of the bowl clogging occurs. Because of the upward slant and squeeze like construction of this middle arm in bowl traps, it is difficult for the clogging object to be pushed or flushed over the hub of the trap; and it is often necessary as a last resort to remove the bowl from its base, turn it upside down and eject the obstruction from the trap by a snake or other instrument inserted from the bottom of the bowl.

Other objects and advantages of this invention will become obvious as this specification unfolds in detail and by reading it in conjunction with the accompanying drawings wherein a preferred form of the invention is illustrated.

In the drawings:

Fig. 1 shows a water closet of the siphon type wherein my invention is incorporated.

Fig. 2 is a detailed enlargement of my improvement.

Fig. 3 is a plan view of the plug section.

Fig. 4 is a plan view of the opening in the bowl.

In the accompanying drawings a conventional type of water closet bowl 1, such as the siphon type, is shown; and the bowl 1 is represented in vertical cross section so as to expose to view its internal trap section 2. The middle arm 3 is where the obstructing articles usually clog, being squeezed in the arm and unable to be flushed or pushed over the hub 4 of the trap into the vertical passage 5.

Through the outside wall 6 of the bowl there is an opening 7 affording access to the interior or trap 2 of the bowl, and particularly affording communication with the middle arm 3 of the trap. This opening 7 is substantially in line with the middle arm 3 of the trap; and this opening 7 is intended to be at a point through the bowl so as to afford easy access of a probe inserted through the opening with the middle arm permitting it to dislodge any obstruction contained in the arm. This opening 7 into the interior of the bowl is for best results positioned at a point through the bowl in opposed relation to the highest elevation 8 of the trap.

When opening 7 is not in use appropriate removable means, such as a plug 9, is provided for closing the opening.

Opening 7 may take various forms, and need not take the preferred form indicated. Opening 7 as preferred is cylindrical with a recessed shoulder 10 at its entrance 11.

The plug 9 when in position abuts on the shoulder 10 with its outside face 12 flush with the outside wall 6 of the bowl 1. A suitable washer, which may be of rubber or fibre, 13, is preferred between the plug 9 and the shoulder 10 to insure against leakage on flushing of the bowl.

Plug 9, while it may be of various materials, is preferably of porcelain, and has preferably molded to its base a metal washer 14 which strengthens the plug and lessens its chances of cracking. Plug 9 may be held in place in the opening 7 by various means: it may be threaded into the opening; or, as here it is made to rest on the shoulder 10 and is held in place by fastening means such as studs 15 and female fasteners 16. On assembling the plug into the opening the female fasteners 16 are inserted in the holes 17 of the plug and are threaded on the studs 15.

My invention may be incorporated in urinals having traps similar to those of water closets, such as certain types of wall hung urinals; and which urinals because of such similarity are broadly called and included in the term water closet.

While I have shown and described a preferred form of my invention, I do not wish to limit myself to the precise details of structure shown, and it is my intent to claim all that may be reasonably within the spirit of the invention and the scope of the appended claims.

What is claimed is:

In a water closet bowl of the character described, a cylindrical recessed shouldered opening through the exterior front wall of the bowl in direct opposition to and in communication with the middle arm of the bowl trap, a porcelain plug removably secured in such opening, which plug has its outside face flush with the outside wall of the bowl, a metal washer molded to the base of the plug, a washer between the plug and the shoulder of said opening to prevent leakage to the outside of the bowl, recessed openings through said plug, and headed female tubular fasteners contained in said plug openings and threaded upon studs fixed in the shoulder of the bowl opening.

VINCENT DI MARZO.

REFERENCES CITED

The following references are of record in the file of this patent:

UNITED STATES PATENTS

| Number | Name | Date |
|---|---|---|
| 918,036 | Gibson | Apr. 13, 1909 |
| 1,827,663 | Mastrillo | Oct. 13, 1931 |
| 1,929,131 | Winstanley | Oct. 3, 1933 |